United States Patent [19]

Letzo

[11] Patent Number: 4,721,174
[45] Date of Patent: Jan. 26, 1988

[54] FISH WEIGHT SCALE

[76] Inventor: Richard C. Letzo, 5845 Deerhollow La. East, Sarasota, Fla. 33582

[21] Appl. No.: 69,638

[22] Filed: Jul. 6, 1987

[51] Int. Cl.[4] .................... G01G 3/00; G01G 19/52
[52] U.S. Cl. .................... 177/225; 177/132; 177/245
[58] Field of Search ................. 177/132, 225, 245

[56] References Cited

U.S. PATENT DOCUMENTS

| | | | |
|---|---|---|---|
| 1,031,917 | 7/1912 | Dennison | 177/245 X |
| 1,458,014 | 6/1923 | Wailes | 177/245 X |
| 1,518,205 | 12/1924 | Kountz | 177/245 X |
| 2,237,370 | 4/1941 | Shekter | 177/245 X |
| 3,223,189 | 12/1965 | Robbins | 177/225 X |
| 3,276,527 | 10/1966 | Nelson | 177/245 X |
| 3,967,578 | 7/1976 | Gallo | 177/225 X |

Primary Examiner—George H. Miller, Jr.
Attorney, Agent, or Firm—Charles J. Prescott

[57] ABSTRACT

A light-duty fish weight scale which is connectable to generally horizontal elongated supports such as fishing rods and the safety rail of a boat. The fish scale includes a shank formed of slender, flexible resilient material such as wire or a strip of flat sheet material and is connectable at one end to the elongated support whereby the shank is then spaced generally parallel to the support. The shank is adapted to supportively receive the downwardly hanging weight of a fish and be deflected in cantilever fashion in proportion to the weight of the fish. The other end of the shank is adapted, in conjunction with weight indicia connectable to the support, to provide viewable indicia of the actual weight of the hanging fish. In one embodiment, the means for hanging the fish from the shank also provides a pointer to the proper weight indicia, facilitates the stored position for the invention, and provides means for securing the fish hook attached at the end of the fishing line when the fishing rod is not in use.

11 Claims, 11 Drawing Figures

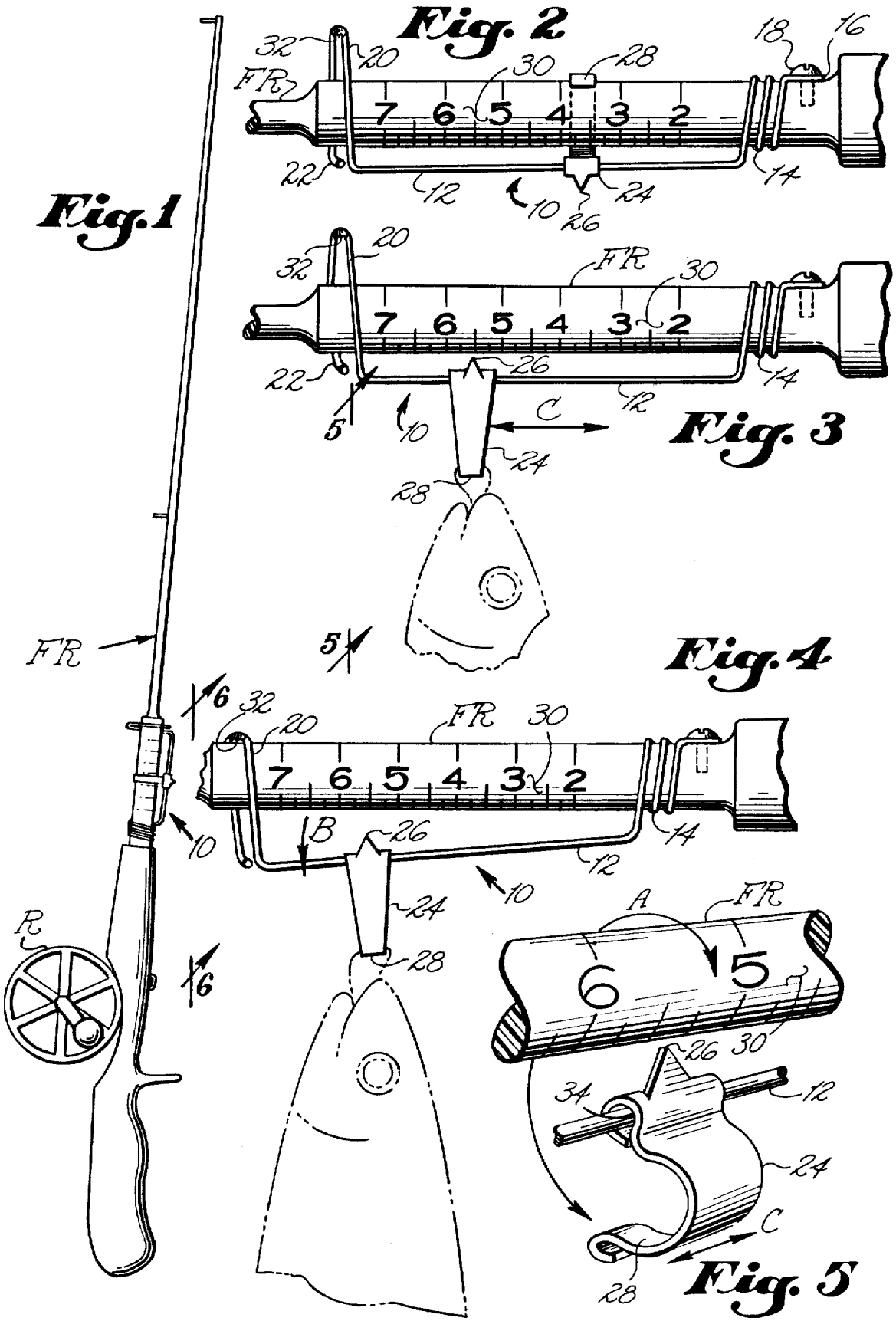

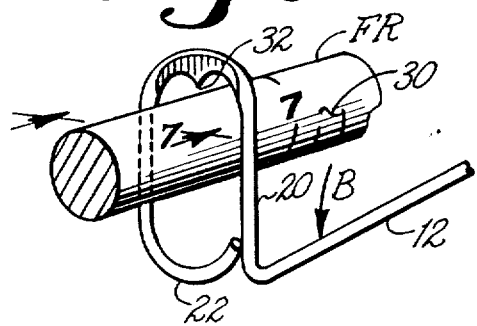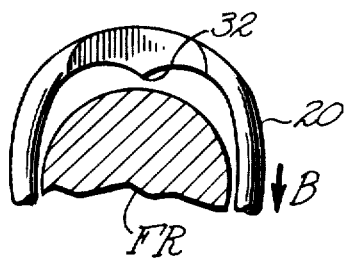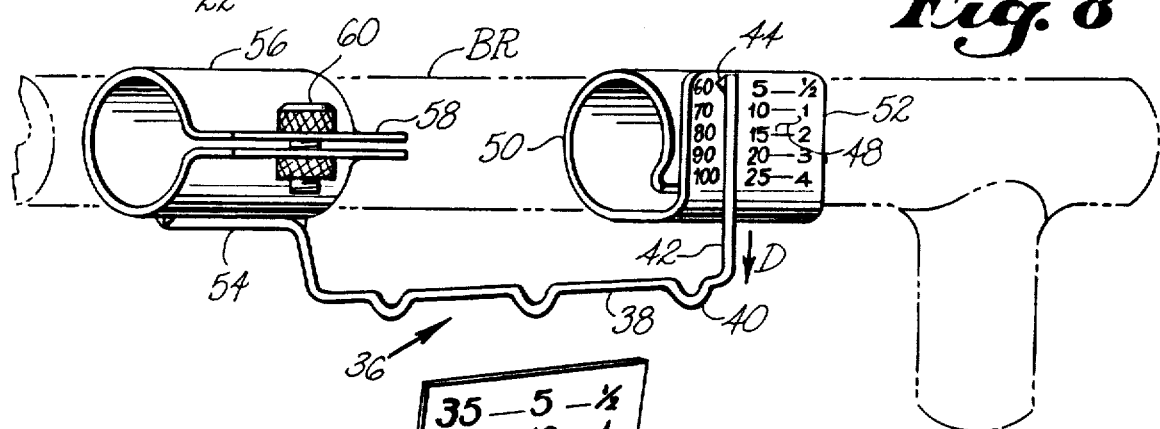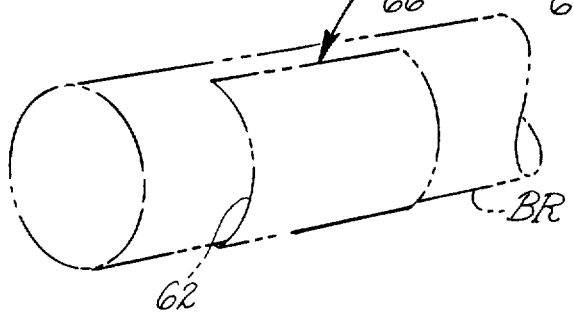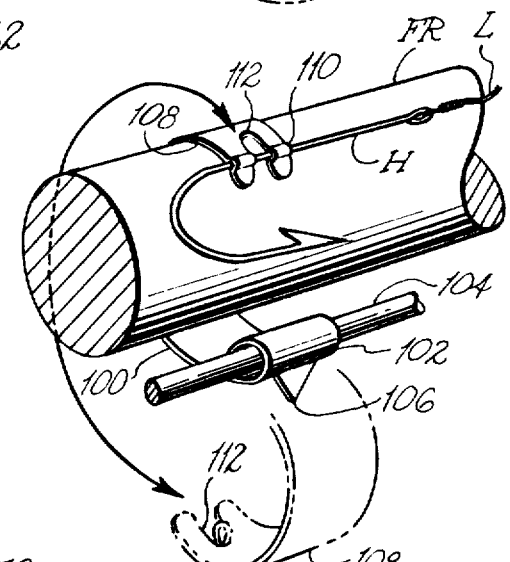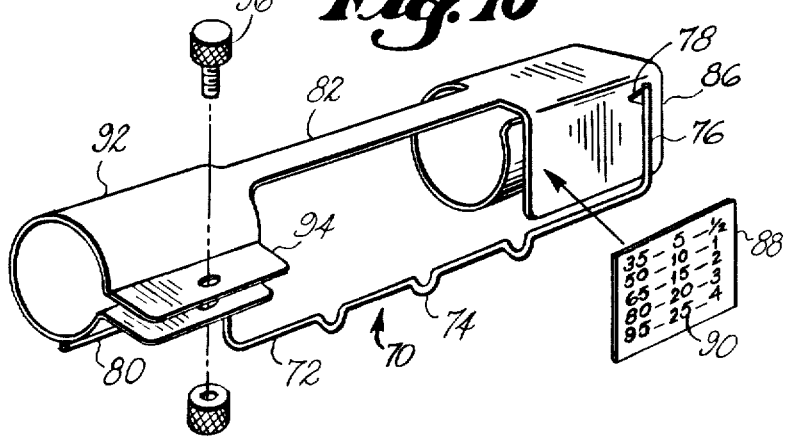

FISH WEIGHT SCALE

BACKGROUND OF THE INVENTION

This invention relates generally to fish weight scales and, more particularly to a light-duty fish scale which is connectable to horizontally disposably support members such as fishing rods, boat safety rails and the like.

Fishing laws in many states restrict the physical minimum size by weight of fish which may be legally caught. Additionally, fishermen are always curious as to the weight of the fish caught so as to avoid making "liars" out of otherwise honest men.

For those fishermen who catch substantially larger fish, and wherein no size or weight limitations prevail in ocean fishing and the like, dock facilities for such commercial fishing typically include large scales to facilitate the accurate weighing of fish caught upon return. Such scales are typically quite expensive and, therefore, not normally found in individual vessels.

However, only separately carryable conventional coil spring pulltype activated weight scales are available to fishermen of smaller fish of less than, for example, fifty pounds, more typically in the one to ten pound range. Such scales are tyically relegated to the bottom of fishing tackle boxes and are notoriously known to be corroded or otherwise full of debris when it is time for their use. Additionally, such scales are unreliable in less expensive forms and considerably more expensive for the more reliable and less corrosive type models.

The present invention provides a light duty fish weight scale which is easily connectable to a horizontally disposable elongated support, particularly such as fishing poles and the safety rails of boats. Thus, the present invention is readily available as soon as the fish is caught and otherwise unobstructing of the normal fishing activity. Further, the present invention is inexpensive to fabricate, generally does not deteriorate in accuracy when left unused, and is easily connectable to such support members without requiring the purchase of additional expensive equipment or tools.

BRIEF SUMMARY OF THE INVENTION

The present invention is directed to a light-duty fish weight scale which is connectable to generally horizontal elongated supports such as fishing rods and the safety rail of a boat. The fish scale includes a shank formed of slender, flexible resilient material such as wire and strips of sheet material and is connectable at one end to the elongated support whereby the shank is then spaced generally parallel to the support. The shank is adapted to supportively receive the downwardly hanging weight of a fish and be deflected in cantilever fashion in proportion to the weight of the fish. The other end of the shank is adapted, in conjunction with weight indicia connectable to the support, to provide viewable indicia of the actual weight of the hanging fish. In one embodiment, the means for hanging the fish from the shank also provides a pointer to the proper weight indicia, facilitates the stored position for the invention, and provides means for securing the fish hook attached at the end of the fishing line when the fishing rod is not in use.

It is therefore an object of this invention to provide a fish weight scale which is easily connectable to horizontally disposed or horizontally positionable elongated support members.

It is another object of the present invention to provide a fish weight scale which is easily connectable to fishing rods.

It is another object of the present invention to provide a fish weight scale which is easily connectable to generally horizontal elongated support members of other existing structure and fishing equipment such as the safety rails connected to boats.

It is another object of the present invention to provide a fish weight scale which is economical to manufacture and purchase.

It is another object of the present invention to provide a fish weight scale which is always readily at hand during fishing for immediately weighing fish caught, while also being unobtrusive during the other activities of fishing.

It is another activities of the present invention to provide a fish weight scale which is generally unaffected by deterioration due to use and environment.

In accordance with these and other objects which will become apparent hereinafter, the instant invention will now be described with reference to the accompanying drawings in which:

BRIEF DESCRIPTION OF THE DRAWINGS

FIG. 1 is a side elevation view of the invention installed on a fishing rod in its unweighted and stored position.

FIG. 2 is a side elevation view of one embodiment of the invention in its unweighted position.

FIG. 3 is a side elevation view of FIG. 2 as a fish is being attached thereto for weighing.

FIG. 4 is a side elevation view of FIG. 3 ready for viewing by the user to determine the weight of the fish hanging downwardly therefrom.

FIG. 5 is an enlarged perspective view in the direction of arrows 5—5 in FIG. 3.

FIG. 6 is an enlarged perspective view in the direction of arrows 6—6 in FIG. 4.

FIG. 7 is a further enlarged view in the direction of arrows 7—7 in FIG. 6.

FIG. 8 is a perspective view of another embodiment of the invention as installed on the safety rail of a boat (shown in phantom).

FIG. 9 is an exploded perspective view of another embodiment of the weight indicia of the invention as shown in FIG. 8.

FIG. 10 is an exploded perspective view of a unitized embodiment of the invention as shown in FIG. 8.

FIG. 11 is a enlarged perspective view of a portion of another embodiment of the invention in its stored position (in-use position shown in phantom).

DETAILED DESCRIPTION OF THE INVENTION

Referring now to the drawings, and particularly to FIGS. 1-8, the preferred embodiment of the invention for use in conjunction with a fishing rod FR having a reel R attached thereto in well-known arrangement is shown generally at numeral 10. This embodiment 10 includes an elongated length of resilient wire forming a shank 12 and connectable over the fishing rod FR at its first end 14 which has been formed as shown into a plurality of turns of the wire and also having loop 16 adapted to receive screw 18 which is threadably engagable into the fishing rod FR. It is here noted that other forms of attachment of the first end of shank 12 may be employed such as conventional clamp means, epoxy glue and the like, and remain within the scope of this invention. By this arrangement, the main elongated body of the shank 12 is disposed so as to be spaced from the fishing rod FR in a generally parallel arrangement thereto.

The other end 20 of the shank 12 is shaped to form a generally transverse loop which surrounds the fishing rod FR when the weight fish scale 10 is connected at its first end 14 as previously described.

As best seen in FIGS. 6 and 7, the second end 20 includes stop 32 downwardly disposed from the upper portion of the looped second end 20 and a lower stop 22, both serving to limit the cantilever-fashion travel of shank 12 about first end 14.

Also connected to shank 12 is slide pointer 24 which is slidably mounted by tubular shape 34 on shank 12 to be laterally displaced by hand back and forth in the direction of arrow C in FIG. 5 from one end of shank 12 to the other while having sufficient friction therebetween to remain as set by hand on shank 12. Slide pointer 24, fabricated of rigid, resilient material, includes pointer 26 disposed at one end and, in a C-type section configuration, also includes the multi-functioning second end portion 28 opposite that of pointer 26. The added functioning relates to the C-shaped contour, which facilitates attaching a fish thereto as depicted in FIGS. 3 and 4, and also facilitates interengagement around the fishing rod FR in the stored position as best seen in FIGS. 2 and 5. In FIG. 5, the slide pointer is rotatable in the direction of arrow A for storage.

Disposed longitudinally on the fishing rod FR is weight scale 30 having numerical indicia thereon which is indicative of the weight of an object to be hung from the fish weight scale 10. This weight scale 30 may be in the form of a metal band fitted around the fishing rod FR or in the form of a strip of adhesive having the appropriate weight indicia printed thereon.

When the fishing rod FR is disposed horizontally, a fish may be attached and downwardly hung from the C-shaped portion 28 of slide pointer 24 as previously described and as shown in FIGS. 3 and 4. The weight of the fish deflects the shank 12 downwardly in the direction of arrow B in cantilever fashion. Referring to FIGS. 6 and 7, by laterally sliding the slide pointer 24 on shank 12, with the fish hanging downwardly therefrom, the precise positioning of the slide pointer 24 may be achieved wherein stop 32 just contacts the fishing rod FR. At that precise laterial positioning of the slide pointer 24, the pointer 26 will indicate on eight scale 30 the exact weight of the fish hanging downwardly. If the slide pointer 24 is too far to the right as viewed in FIG. 4, the stop 32 will not quite touch the fishing rod FR. If the slide pointer 24 is slide on shank 12 too far to the left, it will be moved beyond the precise point at which stop 32 just touches the fishing rod FR and will indicate a weight on weight scale 30 in excess of the actual weight of the fish.

Referring now to FIG. 8, an alternate embodiment of the invention is shown generally at numeral 36 intended for interconnection to the boat rail BR of a boat, usually in the form of tubular stainless steel as shown in phantom. This embodiment 36 includes shank 38 formed of resilient wire and having downwardly disposed detents 40 along its length. First end 54 of shank 38 is connected to split collar 56 having flanges 58 and a mateing threaded fastener 60 disposed therethrough for locking the split collar 56 onto the boat rail BR. The second end 42 of shank 38 is upwardly disposed having pointer 44 connected at its distal end and longitudinally pointing as shown.

Still referring to FIG. 8, clip 50 includes panel 52 having weight indicia 48 thereon and is fabricated of formed resilient sheet material contoured to mateably engage over the cylindrical-shaped boat rail BR. By this arrangement, then, weight scale indicia 48 is disposed in readable proximity with the pointer 44 such that, when the second end 42 is downwardly deflected in cantilever fashion in the direction of arrow D, pointer 44 is readable opposite a particular weight value.

The plurality of detents 40 disposed along shank 38 are provided to accommodate a broad range of weights of fish. Larger fish are placed in the detent 40 closer to fixed first end 54, while lighter fish are hung downwardly from detent 40 closer to the second end 42. Weight indicia 48 is likewise provided with an equal number of weight ranges as shown and the appropriate weight range may be made viewable in registry with pointer 44 by simply laterally sliding clip 50 along the boat rail BR.

Referring to FIG. 9, an alternate and simpler form of weight scale 62 used in conjunction with shank 38 in Figure is shown having weight indicia 64 thereon. This embodiment 62 is in the form of a resilient sheet material having an adhesive back 66 which may be adhered to the boat rail BR as shown in phantom.

Referring now to FIG. 10, an alternate embodiment 70 of the invention as described in FIG. 8 is shown. Again, shank 72, including downwardly disposed detents formed therein, is rigidly interconnectable at its first end 80 by split clamp 92 and two-part threaded fastener 96. However, in this embodiment, the clip 84 is interconnected to split collar 92 by band 82 to unitize this entire assembly. Downwardly disposed panel 86 includes weight scale 88 having weight indicia 90 thereon which is adhesively attachable to panel 86. The second end 76 of shank 72, also having a pointer 78 thereon as previously described in FIG. 8, is thus in viewable alignment and registry with the weight indicia 90 thereon. A plurality of detents 74 are included for downwardly disposing and hanging a fish therefrom as previously described; however, in this embodiment 70, the upwardly extending second end 76 having indicator 78 thereon is non-moveable in relation to panel 86 and weight scale 88 attached thereto. Nonetheless, less, the user may project by eye the positioning of the indicator 78 across to the appropriately chosen weight range on weight indicia 90.

Referring lastly to FIG. 11, two additional features of the invention are shown added to the embodiment of the slide pointer described in FIGS. 1 through 8. In this figure, the slide pointer 100, slideably engagable onto shank 104 by tubular portion 102 from which pointer 106 is disposed, also includes fish hook engaging structure at its opposite end 108 as now described and shown. The fish hook H is insertable into deformations 110 such that, when end 108 is engaged around fishing rod FR as shown, the fish hook H attached at the end of the fishing line L is held rigidly against the fishing rod FR. In use, as shown in phantom, indent 112 is provided to engage hook means SH for convenient downwardly hanging of a fish therefrom for weighing.

While the instant invention has been shown and described herein in what is conceived to be the most practical and prferred embodiment, it is recognized that departures may be made therefrom within the scope of the invention, which is therefore not to be limited to the details disclosed herein, but is to be accorded the full scope of the claims so as to embrace any and all equivalent apparatus and articles.

What is claimed is:

1. A light-duty fish weight scale connectable to a generally horizontally positionable elongated support such as a fishing pole, a boat safety rail, or the like, said fish weight scale comprising:
   a shank formed of a length of relatively slender, flexible, resilient material connectable at one end to the elongated support;
   said shank spaced generally parallel and adjacent to the elongated support when said one end of said shank is connected thereto;
   weight indicia connectable to the elongated support adjacent said shank;
   said shank moveable in cantilever fashion about said one end between an unweighted position wherein it is undeflected to a weighted position wherein it is deflected away from the elongated support;
   means for releasably imposing a fish's weight onto said shank when the elongated support is generally horizontal whereby said shank is moved into said deflected position;
   said shank deflection viewable in relation to, and readable on, said weight indicia.

2. A light-duty fish weight scale as set forth in claim 1, further comprising:
   a slide pointer slidably mounted on said shank;
   said weight indicia connectable longitudinally on the elongated support;
   said shank other end shaped in relation to the elongated support to provide deflection indica for indicating when said shank is deflected just to its fully weighted position;
   said slide pointer in relation to said weight indicia providing a readable weight amount of the fish hanging downwardly from said slide pointer just as said deflection indicia indicates that said shank is deflected to its fully weighted position.

3. A light-duty fish weight scale as set forth in claim 2, wherein:
   said slide pointer also includes a lift hook for releasable interengagement tot he fish to be weighed.

4. A light-duty fish weight scale as set forth in claim 3, wherein:
   said lift hook is also adapted to releasably engage the elongated support when not in use.

5. A light-duty fish weight scale as set forth in claim 4, wherein the elongated support is a fishing pole and wherein;
   said slide pointer also includes a fish hook retention slot for interengagement with a fish hook connected to the end of the fishing rod line when the fishing rod is not in use.

6. A light-duty fish weight scale as set forth in claim 1, wherein, said shank includes a plurality of detents along its length;
   each said detent providing a different rate of deflection of said shank in response to the fish hanging downwardly therefrom;
   said weight indicia having a plurality of different scales corresponding to each said rate of deflection of said shank.

7. A light-duty fish weight scale as set forth in claim 1, wherein:
   said shank material is wire.

8. A light-duty fish weight scale connectable to a fishing rod at is main elongated portion, said fish weight scale comprising:
   a shank having a first and second end and formed of a length of relatively slender, flexible, resilient material;
   said shank first end connectable to the fishing rod elongated portion;
   said shank spaced generally parallel to the fishing rod elongated portion when said first end is connected thereto;
   weight indicia connectable longitudinally to the fishing rod elongated portion adjacent said shank;
   a slide pointer slideably mounted on said shank and providing viewable alignment and registry with a particular weight value on said weight indicia for each particular position of said slide pointer along said shank;
   said slide pointer also including means for interengagement with and downwardly hanging of a fish therefrom when the fishing rod is generally horizontal;
   said shank movablein cantilever fashion about said first end between an unweighted position whereby it is undeflected to a weighted position where it is deflected away from the fishing rod elongated portion;
   said second end adapted to provide indicia in relation to the fishing rod elongated portion for indicating when said shank is deflected just to its fully weighted position.

9. A light-duty fish weight scale as set forth in claim 8, wherein:
   said shank material is wire.

10. A light-duty fish weight scale connectable to horizontal elongated objects such as boat safety rails and the like, said fish weight scale comprising:
    a shank having a first and second end and formed of a length of relatively slender, flexible, resilient material;
    said shank first end including a clamp which is connectable to the elongated object;
    said shank having at least one hook detent and spaced generally parallel to the elongated object when said first end is connected thereto;
    weight indicia connectable generally transversely to the elongated object in proximity to said shank second end;
    said shank movable in cantilever fashion about said first end and between an unweighted position wherein it is undeflected to a weighted position wherein it is deflected away from the elongated object in proportion to the weight of a fish hanging downwardly therefrom;
    said shank second end providing viewable alignment and registry with a particular weight value on said weight indicia for a particular weight fish hanging downwardly therefrom at a particular said hook detent.

11. A light-duty fish weight scale as set forth in claim 10, wherein:
    said shank material is wire.

* * * * *

UNITED STATES PATENT AND TRADEMARK OFFICE
CERTIFICATE OF CORRECTION

PATENT NO.   :   4,721,174
DATED        :   January 26, 1988
INVENTOR(S)  :   Richard C. Letzo It is certified that error appears in the above-identified patent and that said Letters Patent is hereby corrected as shown below:

In Column 2, Line 17, replace the word "activities" with the word --object--.

In Column 5, Line 46, replace the words "tot he" with the words -- to the--.

In Column 6, Line 26, replace the word "movablein" with the words --movable in--.

Signed and Sealed this

Twenty-first Day of June, 1988

Attest:

DONALD J. QUIGG

Attesting Officer

Commissioner of Patents and Trademarks